(12) United States Patent
Lee (10) Patent No.: US 8,812,741 B2
(45) Date of Patent: Aug. 19, 2014

(54) MANAGEMENT DATA INPUT/OUTPUT PROTOCOL WITH PAGE WRITE EXTENSION

(71) Applicant: Broadcom Corporation, Irvine, CA (US)

(72) Inventor: Whay Sing Lee, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 16 days.

(21) Appl. No.: 13/628,640

(22) Filed: Sep. 27, 2012

(65) Prior Publication Data

US 2014/0089529 A1   Mar. 27, 2014

(51) Int. Cl.
*G06F 13/38* (2006.01)
*G06F 13/12* (2006.01)

(52) U.S. Cl.
USPC ............... 710/4; 710/2; 710/5; 710/8; 710/15

(58) Field of Classification Search
None
See application file for complete search history.

(56) References Cited

U.S. PATENT DOCUMENTS

2003/0110344 A1* 6/2003 Szczepanek et al. ......... 711/100
2013/0111085 A1* 5/2013 Futami ......................... 710/105

* cited by examiner

*Primary Examiner* — Scott Sun
(74) *Attorney, Agent, or Firm* — Sterne, Kessler, Goldstein & Fox P.L.L.C.

(57) ABSTRACT

A process to manage data between one or more MDIO manageable devices situated on the same bus utilizing the MDIO protocol. The data management efficiency can be increased through the use of an MDIO protocol that includes a page-write mode. The MDIO protocol including the page-write mode can reduce the overhead for a write operation by omitting various portions of the MDIO communication frame format, including the preamble, start-of-frame, operational code, port address, device address, and turn-around fields that generally precede data to be written. The MDIO protocol including the page-write mode may include a next-data code to initiate the page-write mode.

21 Claims, 6 Drawing Sheets

MANAGEMENT DATA INPUT/OUTPUT PROTOCOL WITH PAGE WRITE EXTENSION

FIELD

This application relates generally to the management data input/output (MDIO) protocol, and more particularly to the MDIO protocol including a page-write mode.

BACKGROUND

Ethernet communications provide high speed data communications over a communications link between two communications nodes that operates according the Institute of Electrical and Electronics Engineers (IEEE) 802.3 Ethernet Standard. Ethernet communication environments may utilize a management data input/output (MDIO) bus interface defined by the IEEE 802.3ae standard to manage Ethernet devices included in the Ethernet communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details.

Management data input/output (MDIO) bus interfaces are defined by the IEEE 802.3ae standard, and can be utilized to manage Ethernet devices within an Ethernet communication environment. Generally, the MDIO interface includes a two-wire bus, one wire for a management data clock (MDC) signal, and another wire for a bidirectional MDIO data signal. Each MDIO interface uses a management device to manage several MDIO manageable devices situated on the same bus.

When the management device is communicating with an MDIO manageable device, the management device can drive the management data clock signal and the MDIO signal. Similarly, a selected MDIO manageable device can drive the MDIO data signal when the MDIO manageable device is providing data to the management device.

The Ethernet communication environment may be described with reference to an Open Systems Interconnect network model (OSI model). The OSI model is an abstract description for layered communications in an Ethernet communication environment, and typically includes seven primary layers. Each of the layers includes a collection of conceptually similar functions, and provides services to an adjacent upper layer and receives services from an adjacent lower layer.

The lowest three layers of the OSI model include the physical layer (layer 1), the data link layer (layer 2) and the network layer (layer 3). The physical layer defines electrical and physical specifications for devices, including a relationship between a device and a physical medium. The data link layer provides for the transfer of data between network entities and error correction. The network layer provides for the transfer of variable length data from a source to a destination via one or more networks.

As mentioned above, the MDIO interface includes a two-wire serial bus that is used to manage physical layer devices (e.g., MDIO manageable devices). The management of these physical layer devices is based on the access and modification of their various registers.

The MDIO interface can utilize media access control (MAC), which provides a data communication protocol and is a sub-layer of the data link layer. In traditional network models, physical layer devices can communicate with management devices (e.g., CPUs) via a serial management interface such as the MDIO protocol.

The management device (operating as an MDIO master) of the MDIO interface may include a central processing unit (CPU) that can issue a write command and data to be written to an MDIO manageable device (operating as an MDIO slave) via the MDIO bus. Upon completion of the write command, the MDIO manageable device can provide the CPU with a confirmation or completion acknowledgement via the MDIO bus.

Figure 1:
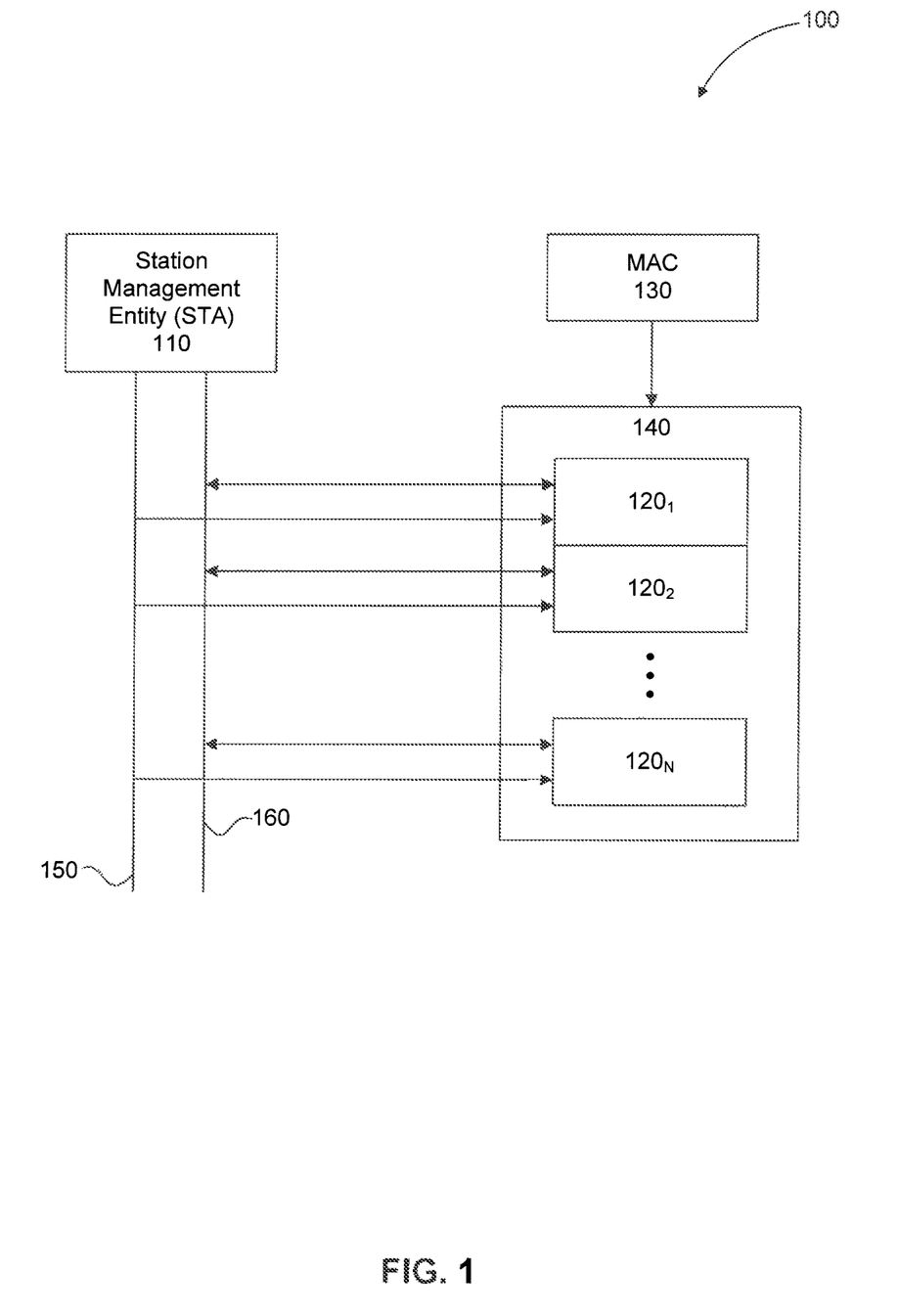
FIG. 1 illustrates a block diagram of an MDIO bus interface according to an exemplary embodiment of the present disclosure.

FIG. 1 illustrates a block diagram of an MDIO bus interface 100 according an exemplary embodiment of the present disclosure. The MDIO bus interface 100 can include two signal lines: a management data clock (MDC) signal line 150 and an MDIO signal line 160.

As defined in the IEEE 802.3ae standard, a management device of an MDIO communication environment is referred to as a station management entity (STA) 110 and the slave devices are referred to as MDIO manageable devices $120_1$-$120_N$. The station management entity 110 can include suitable logic, circuitry, and/or code that can be configured to control overall operation and/or configuration of the MDIO bus interface 100. In particular, the station management entity 110 can initiate communications in the MDIO bus interface 100, and is responsible for driving the management data clock on the management data clock signal line 150.

The station management entity 110 can initiate a command using an MDIO frame, which can include a target register address(es) of one or more of the MDIO manageable devices $120_1$-$120_N$. During a write command, the station management entity 110 can also provide the data to a designated register of the target MDIO manageable device 120. In the case of a read command, the MDIO manageable device 120 can control the MDIO bus line and can supply the station management entity 110 with data read from the MDIO manageable device 120. The MDIO manageable device 120 can include suitable logic, circuitry, and/or code that can be configured to store data in, and retrieve stored data from, registers of the MDIO manageable device 120. The retrieved data from the registers can be provided to the station management entity 110 via the MDIO signal line 160. Further, as illustrated in FIG. 1, the media access control (MAC) 130 can be coupled to the MDIO manageable devices $120_1$-$120_N$ to facilitate interaction with the MDIO manageable devices $120_1$-$120_N$ in the physical layer 140.

Figure 2:
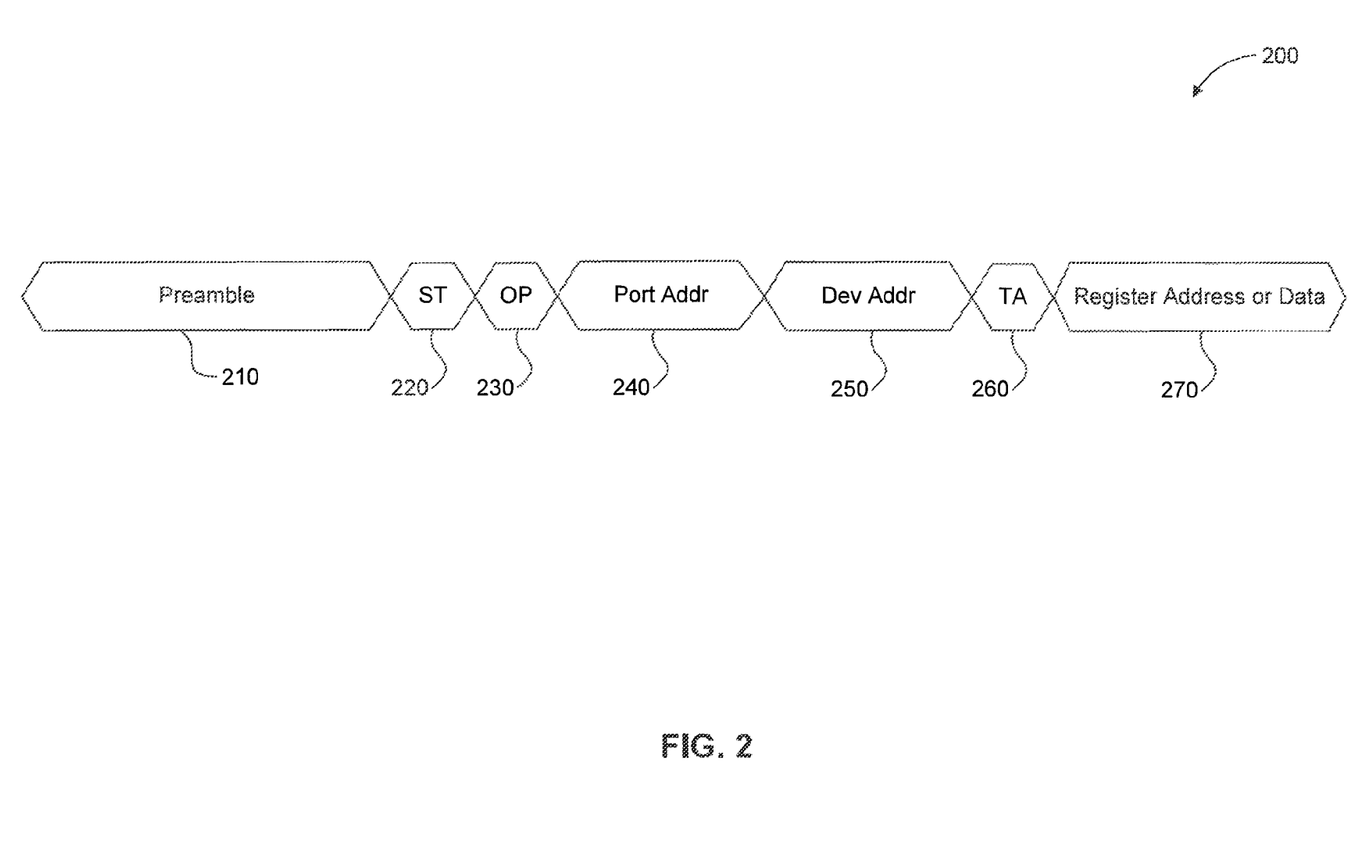
FIG. 2 illustrates a conventional MDIO communication frame format.

FIG. 2 illustrates a conventional MDIO communication frame format 200. With reference to Table 1, the MDIO communication frame format 200 can include: a preamble 210, a start-of-frame (ST) 220, an operational (OP) code 230, a port address 240, a device address 250, a turnaround time 260, and an address/data block 270.

TABLE 1

| Reference Symbol | Portion of Frame | Number of Bits |
| --- | --- | --- |
| Preamble | Preamble | 32 bits |
| ST | Start of Frame | 2 bits |
| OP | OP Code | 2 bits |
| PORTADDR | Port Address | 5 bits |
| DEVADDR | Device Address | 5 bits |
| TA | Turnaround Time | 2 bits |
| ADDR/DATA | Address or Data | 16 bits |

The MDIO communication frame format 200 illustrated in FIG. 2 can be referred to as an extended MDIO frame format, and is defined in Clause 45 of IEEE 802.3ae. This frame format is an improvement over the original frame format defined in Clause 22 of IEEE 802.3. The Clause 22 format limited the number of registers and physical devices that could be accessed using the frame format. In particular, the Clause 22 format can be used to access 32 registers in 32 different physical devices. The extended MDIO frame format (Clause 45) provides for faster transaction speeds as well as the ability to access more destinations. In particular, the extended frame format may access up to 65,536 registers, in 32 different physical devices, on 32 different ports.

Using the extended MDIO frame format, the MDIO communication protocol utilizes two transactions to access each register. First, a frame representing an address transaction is sent to specify the MDIO manageable device 120 and the register within the specified MDIO manageable device 120. For example, in an address transaction, the address/data block 270 includes the address of a register within a specified MDIO manageable device 120. A second frame is then sent to perform the read or write transaction. During a read or write transaction, the address/data block 270 includes the data that has been read from the register specified by the address transaction, or the data to be written at the destination address, respectively. By utilizing two transactions, the extended frame format (Clause 45) is backwards compatible with the original MDIO frame format (Clause 22).

The extended MDIO frame format is identified using the start-of-frame (ST) portion 220 of the frame. In particular, the value of the ST code 220 is set as "00," which identifies Clause 45 data frames, while the original MDIO frame format (Clause 22) is identified with a ST code 220 having the value of "01."

Similarly, the value of the OP code 230 of the extended MDIO frame format identifies the current transaction to be performed. For example, the various transactions and corresponding OP code values are as follows: ADDRESS (00), WRITE (01), READ (11), and a READ-AND-INCREMENT-ADDRESS (READ-INCREMENT) (10).

In operation, one bit is driven onto and/or captured from the MDIO signal line on each management data clock rising edge. Each MDIO transaction is initiated by the preamble 210 (e.g., a fixed 32-bit pattern), followed by a 2-bit start-of-frame (ST) pattern 220. A 2-bit OP code 230 then follows, indicating the current transaction type as discussed above. For example, the ADDRESS transaction is used to latch a register address into the responding MDIO manageable device 120. This latched register address identifies the internal control and/or status register that is affected by subsequent WRITE, READ, and READ-INCREMENT transactions targeting the MDIO manageable device 120.

The MDIO manageable device 120 targeted to respond to the current transaction is identified by a 5-bit port address 240 and a 5-bit device address 250 following the OP code 230. Then, a 16-bit register address, or 16-bit register data 270, is driven on to the MDIO signal line by the station management entity 110 in the case of an ADDRESS transaction, or a WRITE transaction, respectively. In the case of a READ or READ-INCREMENT transaction, 16-bits of requested data are driven on to the MDIO signal line by the responding MDIO manageable device 120.

In an exemplary embodiment of the present disclosure, to reduce the number of transactions to write data spanning several registers, the station management entity 110 and the MDIO manageable devices $120_1$-$120_N$ can include suitable logic, circuitry, and/or code that can be configured to perform a page-write mode. The page-write mode may reduce the number of transactions and/or frame lengths for two or more consecutive WRITE transactions to two or more registers within the MDIO manageable device 120. For the purposes of this discussion, the page-write mode can be used to write data to two or more consecutive registers. However, the registers may not necessarily be consecutively addressed. For example, intervening registers not accessed in the page-write mode may be present between the two or more registers accessed in the page-write mode.

To reduce the number of subsequent transactions to consecutive registers of a MDIO manageable device 120 during the page-write mode, the station management entity 110 and the MDIO manageable devices $120_1$-$120_N$ can be configured to omit the ADDRESS transaction in a subsequent address-write sequence.

For example, an ADDRESS transaction can be initiated to latch a first register address (e.g., register 1) into the MDIO manageable device 120. A WRITE transaction can then be initiated to write data provided in the address/data block 270 of the MDIO communication frame to the first register (e.g., register 1) of the MDIO manageable device 120.

For the subsequent sequence, the ADDRESS transaction can be omitted. In this case, only a subsequent WRITE transaction is performed to write data provided in the address/data block 270 of the subsequent MDIO communication frame to a second consecutive register (e.g., register 2) of the MDIO manageable device 120. One or more subsequent WRITE transactions can be performed for one or more consecutive registers until all of the data has been written.

In an exemplary embodiment of the present disclosure, to omit this subsequent ADDRESS transaction, the station management entity 110 and the MDIO manageable devices $120_1$-$120_N$ can be configured to automatically increment the register address provided in the first address-write sequence by a predetermined increment step size. An example of automatic register address incrementing is discussed in detail in U.S. patent application Ser. No. 12/049,904, filed Mar. 17, 2008, which is incorporated herein by reference in its entirety.

For the purpose of this discussion, the increment step size has a value of "1," which results in the register address being automatically incremented to the next consecutive register. However, the increment step size should not be limited to this value, and the increment step value can be any value that will be apparent to those skilled in the relevant art(s) without departing from the spirit and scope of the present disclosure. If the increment step size is greater than 1, then register(s) are skipped between those registers that are actually accessed via a READ or WRITE command.

In an exemplary embodiment of the present disclosure, to reduce the frame lengths during the page-write mode, various elements of the MDIO communication frame format 200 may be omitted for a page-write mode. For example, the station management entity 110 can be configured replace the preamble 210, start-of-frame 220, operational (OP) code 230, port address 240, device address 250, and turnaround time 260 with a next-data marker (ND). This modified frame format is discussed below with reference to FIG. 3.

Figure 3:
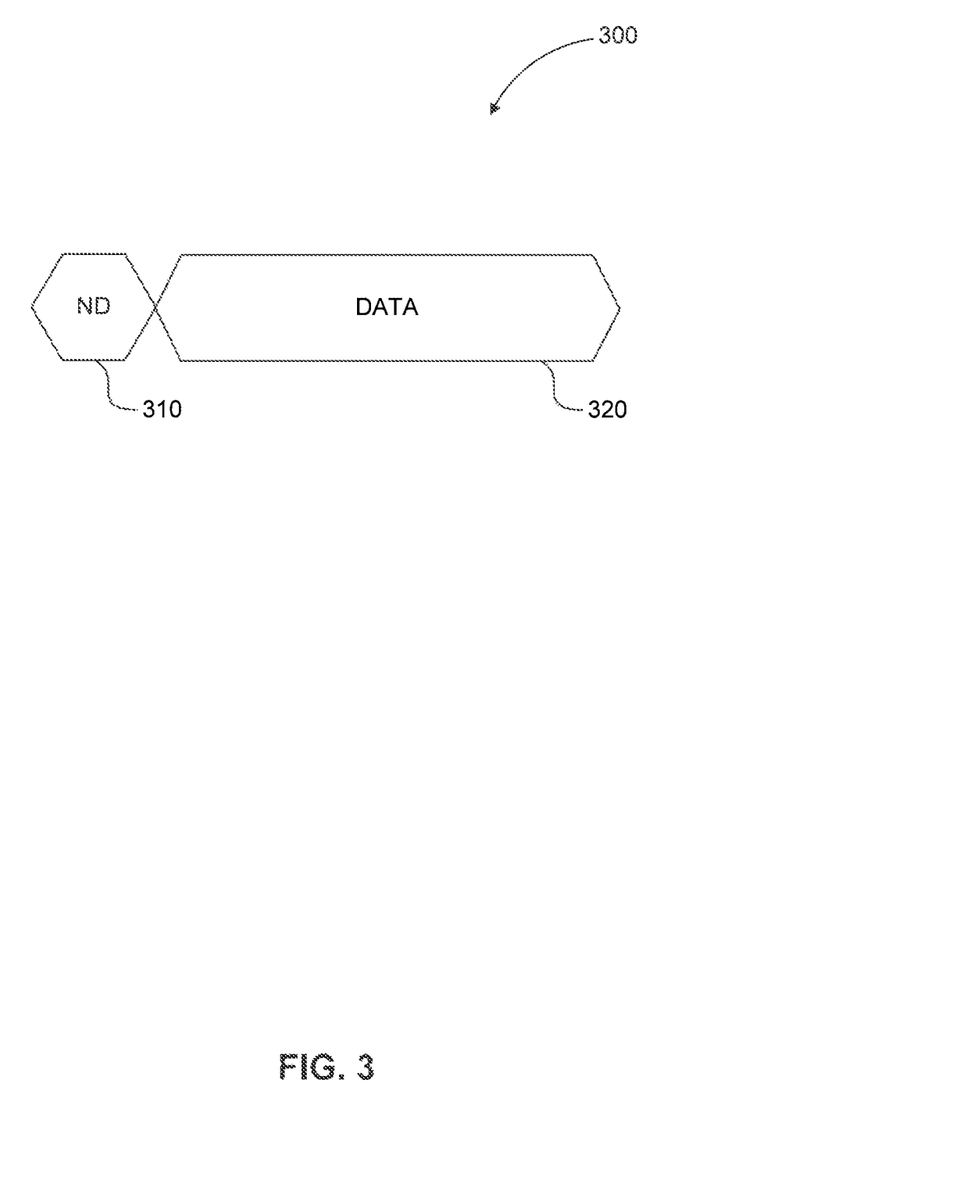
FIG. 3 illustrates an exemplary MDIO communication frame format according to an exemplary embodiment of the present disclosure.

FIG. 3 illustrates an exemplary MDIO communication frame format 300 used in the page-write mode according to an exemplary embodiment of the present disclosure. The MDIO communication frame format 300 can include a 2-bit next-data code 310 followed by the address/data block 320. The address/data block 320 is similar to the address/data block 270 illustrated in FIG. 2.

The 2-bit next-data code 310 may have a value of, for example, "00." The MDIO manageable devices $120_1$-$120_N$ use the next-data code 310 to identify that the MDIO bus interface 100 is operating in the page-write mode, and to identify that the next 16 bits immediately following the next-data code 310 are to be treated as the 16-bit address/data block 320. In particular, the preamble 210 of the MDIO communication frame 200 (e.g., the frame format defined in Clause 45 of IEEE 802.3ae) generally is made up of a 32-bit fixed pattern of all ones. To utilize the page-write mode, the MDIO manageable devices $120_1$-$120_N$ monitor the bus for either the preamble 210 (e.g., "11 . . . 111") or the next-data code 310 (e.g., "00"). When a next-data code 310 is detected, the receiving MDIO manageable devices 120 determines that the MDIO bus interface 100 is operating in the page-write mode, and that the next 16 bits immediately following the next-data code 310 are to be treated as the 16-bit address/data block 320. Those skilled in the art will recognize that other n-bit codes could be used other than the 2-bit code "00", as long as it is not include "11". For example, various combinations of "0" and "1" could be used.

Although it has been described that the 16 bits immediately following the next-data code 310 are to be treated as data (e.g., as 16-bit address/data block 320), the amount of bits should not be limited to 16 bits, as the amount of bits can be greater or smaller than 16. Further, the segment of bits (e.g., 16 bits) should not be limited to a segment immediately following the next-data code 310, as one or more intervening bits may be present between the next-data code 310 and the segment of bits to be treated as data.

In an exemplary embodiment of the present disclosure in which the page-write mode reduces the number of transactions and frame lengths, an ADDRESS transaction can be initiated to latch a first register address (e.g., register 1) into the MDIO manageable device 120. A WRITE transaction can then be initiated to write data provided in the address/data block 270 of the MDIO communication frame to the first register (e.g., register 1) of the MDIO manageable device 120. For a subsequent sequence to write data to a consecutive register, a WRITE transaction can be initiated using the MDIO communication frame format 300 illustrated in FIG. 3. In particular, the MDIO management entity 110 can provide the next consecutive register (e.g., register 2) of the MDIO manageable device 120 with the MDIO communication frame format 300 that includes a 2-bit next-data code 310 and 16-bits of data in the address/data block 320. Upon receipt, the MDIO manageable device 120 recognizes the page write mode based on the 2-bit next-data code, and can store the data in address/data block 320 in the next consecutive register (e.g., register 2) whose register address is an incremented value of the previously latched register address provided in the first address-write sequence. Further, prior to storing the data, the MDIO manageable device 120 can discard the next-data code 310.

Exemplary Code Sequence

As discussed above, the page-write mode can be implemented to reduce the number of transactions and frame lengths. An example code sequence for a series of write transactions to write, for example, 48 bits of data is discussed below utilizing a next-data code 310.

The MDIO management entity 110 may initiate an ADDRESS transaction that includes the following MDIO frame defined by the brackets to latch $ADDR_1$ in the manageable MDIO device identified by PORTADDR and DEVADDR:

[(preamble)(ST)(OP)(PORTADDR)(DEVADDR)(TA) ($ADDR_1$)].

The MDIO management entity 110 may then initiate a WRITE transaction to write the first 16 bits of the 48 bits of data, e.g., $DATA_1$. The WRITE transaction can include the following MDIO frame defined by the brackets:

[(preamble)(ST)(OP)(PORTADDR)(DEVADDR)(TA) ($DATA_1$)].

The MDIO management entity 110 may then initiate a WRITE transaction utilizing the MDIO communication frame format 300 that includes a 2-bit next-data code 310 and 16-bits of data in the address/data block 320 as illustrated in FIG. 3. This WRITE transaction can write the second 16 bit portion of the 48 bits of data, e.g., $DATA_2$. The example MDIO communication frame format 300 is defined below by the brackets:

[(ND)($DATA_2$)].

In response to receiving the above MDIO communication frame format 300, the MDIO manageable device 120 can discard the next-data code (ND) 310 and store the $DATA_2$. The $DATA_2$ is stored in a consecutive register corresponding to the previously latched address ($ADDR_1$) having been incremented by an increment step value of, for example "1." In this example where the incremented register address corresponds to a consecutive register, the $DATA_2$ can be stored in the register having an address value ($ADRR_2$) which equals "$ADDR_1+1$."

The MDIO management entity 110 may then initiate a second WRITE transaction utilizing the MDIO communication frame format 300. This WRITE transaction can write the third 16 bit portion of the 48 bits of data, e.g., $DATA_3$. The example MDIO communication frame format 300 is defined below by the brackets:

[(ND)($DATA_3$)].

In response to receiving the above MDIO communication frame format 300, the MDIO manageable device 120 can discard the next-data code (ND) 310 and store the DATA₃. The DATA₃ is stored in a consecutive register corresponding to the previously latched address (ADDR₂) having been incremented by an increment step value of, for example "1." That is, the DATA₃ can be stored in the register having an address value (ADRR₃) which equals "ADDR₂+1."

Figure 4:
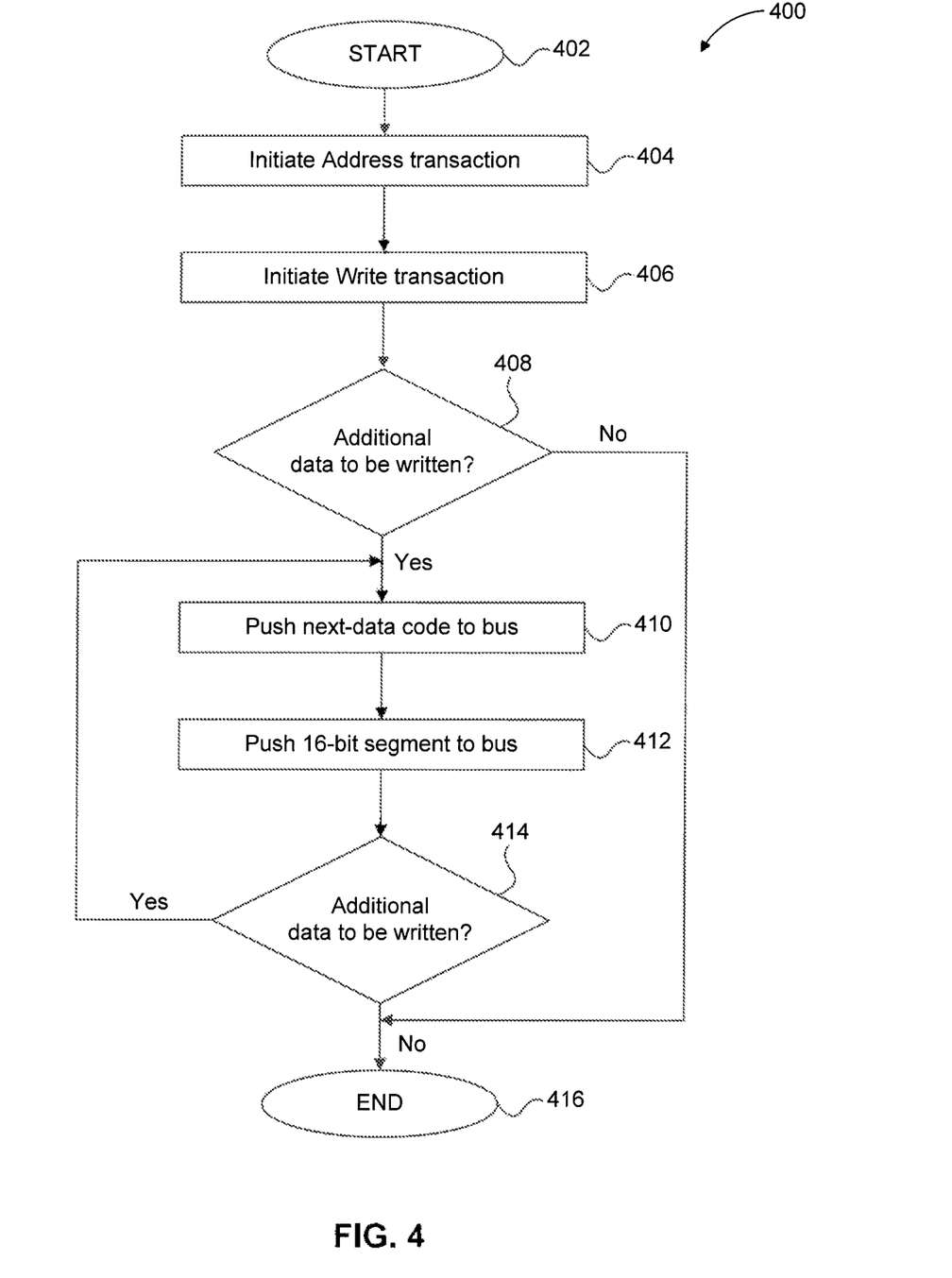
FIG. 4 illustrates a flowchart of a method of data management utilizing the MDIO protocol according to an exemplary embodiment of the present disclosure.

FIG. 4 illustrates a flowchart 400 of a method of data management utilizing the MDIO protocol including a page-write mode in an exemplary embodiment of the present disclosure. The method of flowchart 400 is described with continued reference to FIGS. 1-3, for example purposes.

The method of flowchart 400 begins at step 402 and transitions to step 404, where the station management entity (STA) 110 initiates an ADDRESS transaction with a particular MDIO manageable device 120. The station management entity (STA) 110 generates and sends a first MDIO communication frame that identifies the particular MDIO manageable device 120 using the port address 240 and device address 250 fields of the first MDIO communications frame. Further, the ADDRESS transaction latches a register address provided in the address/data block 270 of the first MDIO communication frame.

After step 404, the flowchart 400 transitions to step 406, where the station management entity (STA) 110 initiates a WRITE transaction. The WRITE transaction writes data provided in the address/data block 270 of the MDIO communication frame to the register (of the MDIO manageable device 120) associated with the register address latched in the preceding ADDRESS transaction. More specifically, the station management entity (STA) 110 generates and sends a second a MDIO communication frame that follows the first, which includes the data to be written to the register address latched in the preceding ADDRESS transaction using the first MDIO communications frame.

After step 406, the flowchart 400 transitions to step 408, where the station management entity (STA) 110 determines if additional data is to be written. If the station management entity (STA) 110 determines that additional data is to be written (YES at step 408), the flowchart 400 transitions to step 410. Otherwise, if the station management entity (STA) 110 determines that no additional data is to be written (NO at step 408), the flowchart 400 transitions to step 416, where the flowchart 400 ends.

At step 410, the station management entity (STA) 110 may initiate a page-write mode that uses the next-data code 310 of the MDIO communication frame format 300 illustrated in FIG. 3.

For example, the station management entity (STA) 110 may push the next-data code 310 to the bus. In this case, the next-data code 310 instructs the MDIO manageable device 120 to treat the next 16-bit segment following the next-data code 310 as data (e.g., as 16-bit data block 320). The next-data code 310 also instructs the MDIO manageable device 120 to increment the previously latched register address by a predefined increment step value (e.g., "1"), and to store the received 16-bit segment in the register associated with this incremented register address. The next-data code 310 may be discarded by the MDIO manageable device 120 following the latched register address being incremented.

After step 410, the flowchart 400 transitions to step 412, where the station management entity (STA) 110 may push the next 16-bits to the bus. As discussed above, the MDIO manageable device 120 treats this 16-bit segment as data, and stores this 16-bit data segment in the register associated with the incremented register address. In the context of this flowchart discussion, the next data code and data segment can be considered to be a third MDIO communications frame (although modified, as the MDIO standard preamble and ID fields are bypassed) that is sent from the station management entity (STA) 110 to the MDIO manageable device 120 identified in ADDRESS transaction detailed above.

After step 412, the flowchart 400 transitions to step 414, where the station management entity (STA) 110 determines if additional data is to be written. If the station management entity (STA) 110 determines that additional data is to be written (YES at step 414), the flowchart 400 returns to step 410. Otherwise (NO at step 414), the flowchart 400 transitions to step 416, where the flowchart 400 ends.

Figure 5:
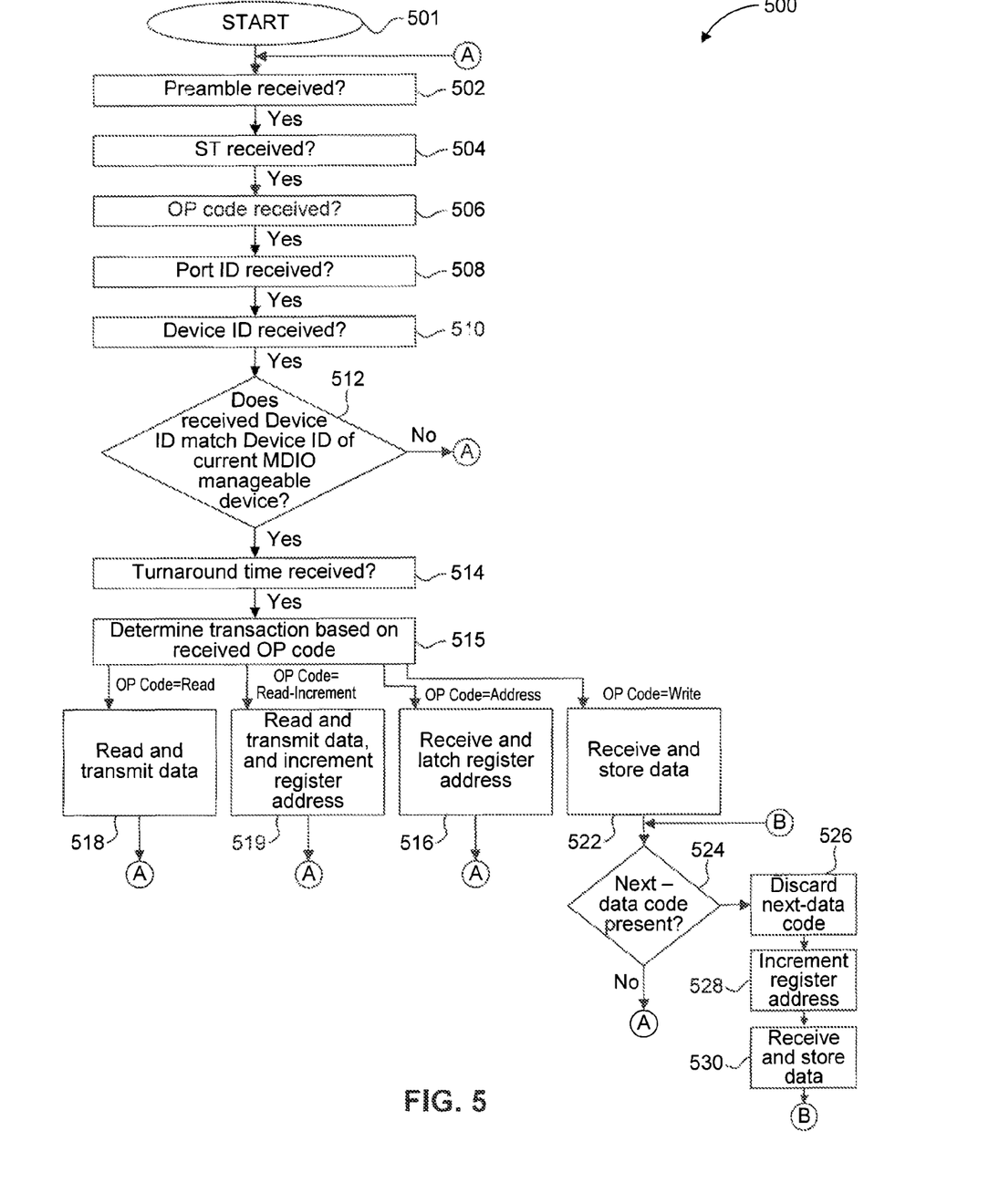
FIG. 5 illustrates a flowchart of a method of data management utilizing the MDIO protocol according to an exemplary embodiment of the present disclosure.

FIG. 5 illustrates a flowchart 500 of a method of data management utilizing the MDIO protocol including a page-write mode in an exemplary embodiment of the present disclosure. The method of flowchart 500 is described with continued reference to FIGS. 1-3, for example purposes. The flowchart 500 describes the operations of the MDIO manageable device 120.

The method of flowchart 500 begins at step 501 and transitions to step 502, where MDIO manageable device 120 monitors the bus of the MDIO bus interface 100 to determine the presence of a preamble 210. If the preamble 210 has been pushed to the bus of the MDIO bus interface 100 by a station management entity (STA) 110, and is received by the MDIO manageable device 120, the flowchart 500 transitions to step 504. If the preamble 210 is not detected and received by the MDIO manageable device 120, the MDIO manageable device 120 continues to monitor the bus.

After step 502, the flowchart 500 transitions to step 504, where the MDIO manageable device 120 receives a start-of-frame (ST) 220.

After step 504, the flowchart 500 transitions to step 506, where the MDIO manageable device 120 receives an OP code 230.

After step 506, the flowchart 500 transitions to step 508, where the MDIO manageable device 120 receives port address 240.

After step 508, the flowchart 500 transitions to step 510, where the MDIO manageable device 120 receives a device address 250.

After step 510, the flowchart 500 transitions to step 512, where the MDIO manageable device 120 determines if the received device address 250 corresponds to the device address of the MDIO manageable device 120. If the received device address 250 does correspond to the device address of the MDIO manageable device 120 (YES at step 512), the flowchart 500 transitions to step 514, where the MDIO manageable device 120 receives a turnaround time 260. Otherwise, if the received device address 250 does not corresponds to the device address of the MDIO manageable device 120 (NO at step 512), the flowchart 500 returns to step 502.

After step 514, the flowchart 500 transitions to step 515, where the MDIO manageable device 120 determines the transaction to be performed based on the previously received OP code 230. Based on the determined transaction, the flowchart 500 transitions to either steps 516, 518, 519, or 522.

If the OP code 230 represents an ADDRESS transaction (e.g., OP code has a value of "00"), the flowchart 500 transitions from step 515 to step 516, where the register address within an address/data block 270, which is received following the receipt of the turnaround time 260, is latched into the MDIO manageable device 120. Following step 516, the flowchart 500 returns to step 502.

If the OP code 230 represents a READ operation (e.g., OP code has a value of "11"), the flowchart 500 transitions from step 515 to step 518, where the MDIO manageable device 120 reads data stored in a previously latched register address and transmits the read data to the station management entity (STA) 110. Following step 518, the flowchart 500 returns to step 502.

If the OP code 230 represents a READ-INCREMENT operation (e.g., OP code has a value of "10"), the flowchart 500 transitions from step 515 to step 519, where the MDIO manageable device 120 reads data stored in a previously latched register address and transmits the read data to the station management entity (STA) 110. The MDIO manageable device 120 then increments the register address by a predetermined amount. Following step 519, the flowchart 500 returns to step 502.

If the OP code 230 represents a WRITE transaction (e.g., OP code has a value of "01"), the flowchart 500 transitions from step 515 to step 522, where the MDIO manageable device 120 receives a 1.6-bit segment from the bus (e.g., 16 bits of data in address/data block 270). The MDIO manageable device 120 then stores the received data in a register having an address corresponding to a previously latched register address obtained from a previous ADDRESS transaction.

After step 522, the flowchart 500 transitions to step 524, where the MDIO manageable device 120 determines if the 16-bit address/data block 270 is immediately followed by a 2-bit next-data code 310 (having a value of, for example, "00") in the subsequent MDIO frame or transmission. As discussed above, the next data code provides notification to the MDIO manageable device 120 that a new data field immediately follows in the next MDIO transmission cycle, without a preceding preamble, etc., and further provides instruction to increment the storage register to receive the new data segment. If the next-data code 310 is not present, the flowchart 500 returns to step 502.

If the next-data code 310 is present, flowchart 500 transitions from step 524 to step 526, where the MDIO manageable device 120 discards the 2-bit next-data code 310 (e.g., discards "00").

After step 526, the flowchart 500 transitions to step 528, where the MDIO manageable device 120 increments the previously latched register address by a predetermined increment step value (e.g., "1" or some other value).

After step 528, the flowchart 500 transitions to step 530, where the MDIO manageable device 120 receives the next 16 bits of data pushed to the bus by the station management entity (STA) 110. The MDIO manageable device 120 treats this 16-bit segment as the next 16-bit address/data block 270 (e.g., 16-bit address/data block 320 in FIG. 3). The MDIO manageable device 120 then stores the received data in a register corresponding to the incremented register address. Following step 530, the flowchart 500 returns to step 524, where the MDIO manageable device 120 determines whether another next data code is present, so the process can repeat if so.

The advantage of the next data code implementation should now be apparent, multiple data blocks 270 can be serially transmitted/received and incrementally stored in the registers of the MDIO manageable device 120, without intervening preambles etc., once the first preamble is processed.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
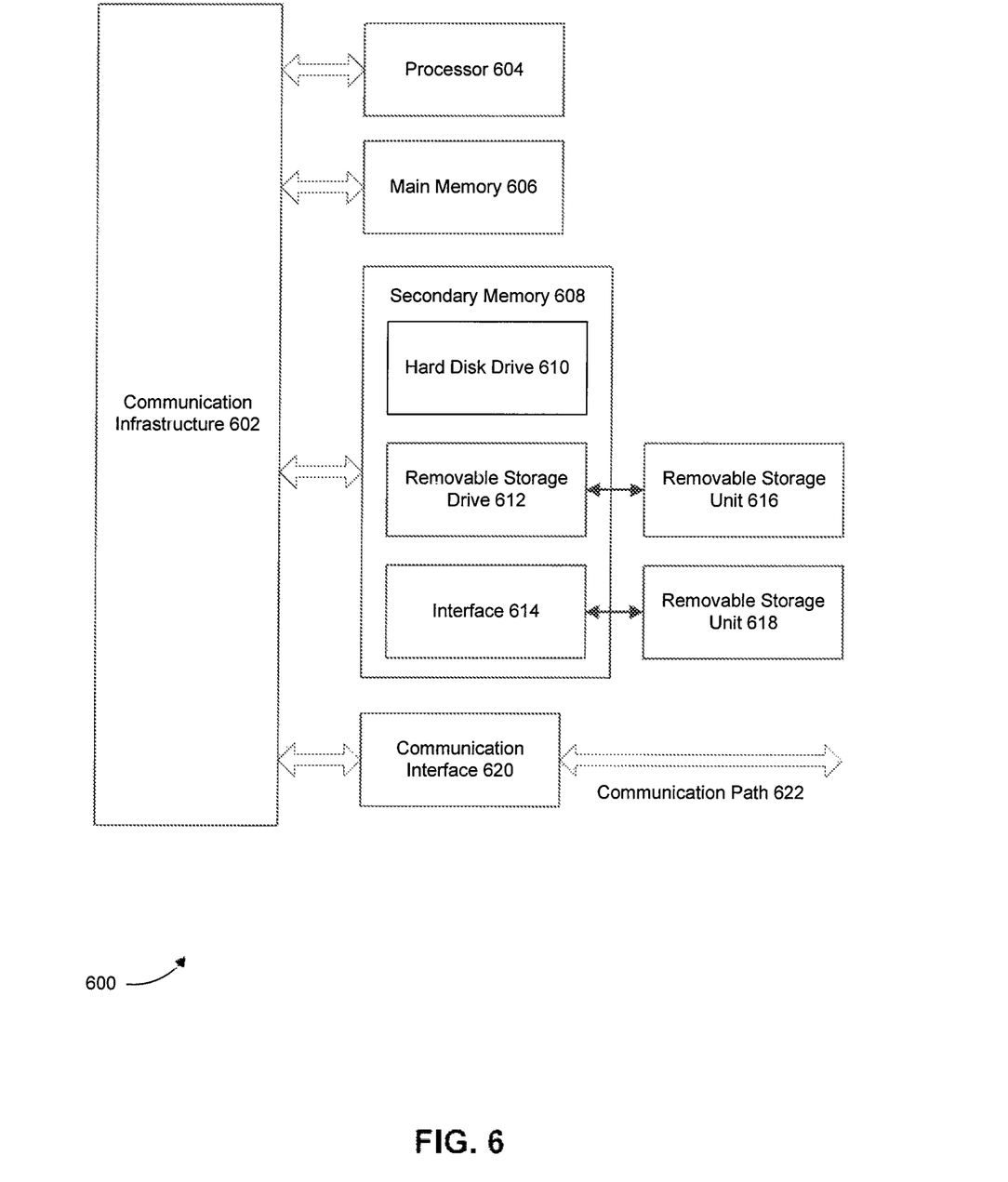
FIG. 6 illustrates a block diagram of an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. At least some of the steps of the flowcharts depicted in FIGS. 4 and 5 can be implemented on one or more distinct computer systems 600, which can also represent at least portions of the station management entity (STA) 110 and MDIO manageable device 120.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure or the claims. Further, the scope of the invention is defined only in accordance with the following claims and their equivalents.

The forgoing Detailed Description of the exemplary embodiments has revealed the general nature of the present disclosure so that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

It will be apparent to those skilled in the relevant art(s) that various changes in form and detail can be made therein without departing from the spirit and scope of the present disclosure. Thus, the invention should not be limited by any of the above-described exemplary embodiments, but should be defined only in accordance with the following claims and their equivalents.

What is claimed is:

1. A method of data management utilizing a management data input/output (MDIO) protocol, the method comprising:
latching a register address received from a station management entity in response to an address transaction initiated by the station management entity;
storing data received from the station management entity at the latched register address in response to a write transaction initiated by the station management entity; and
performing a page write transaction in response to a data frame received from the station management entity, the data frame including a next-data code and a data segment.

2. The method according to claim 1, wherein the page-write transaction is performed based on the next-data code included in the data frame.

3. The method according to claim 2, wherein the next-data code and the data segment are received consecutively, and the data segment immediately follows the next-data code.

4. The method according to claim 1, wherein the page-write transaction includes:
discarding the received next-data code;
incrementing the latched register address by a predetermined increment step value; and
storing the data segment at the incremented latched register address.

5. The method according to claim 4, wherein the next-data code and the data segment are received consecutively, and the data segment immediately follows the next-data code.

6. The method according to claim 1, wherein the data frame does not include:
a preamble, a start-of-frame (ST), an operation (OP) code, a port address, a device address, and a turnaround code.

7. The method according to claim 4, wherein the latched register address is incremented such that the incremented latched register address is a next consecutive register address with respect to the latched register address.

8. A method of data management utilizing a management data input/output (MDIO) protocol, the method comprising:
initiating an address transaction to latch a register address in an MDIO manageable device;
initiating a write transaction to store a first data segment at the latched register address in the MDIO manageable device; and
initiating a page-write transaction to store a second data segment in the MDIO manageable device, the initiating the page-write transaction comprising transmitting a data frame including a next-data code and the second data segment to the MDIO manageable device.

9. The method according to 8, wherein the next-data code included in the data frame instructs the MDIO manageable device to perform the page write transaction.

10. The method according to claim 9, wherein the next-data code and the second data segment are consecutively arranged in the data frame, and the second data segment immediately follows the next-data code.

11. The method according to claim 8, wherein the next-data code instructs the MDIO manageable device to:
  discard the next-data code received in the data frame;
  increment the latched register address by a predetermined increment step value; and
  store the second data segment at the incremented latched register address.

12. The method according to claim 11, wherein the latched register address is incremented such that the incremented latched register address is a next consecutive register address with respect to the latched register address.

13. The method according to claim 8, wherein the data frame does not include:
  a preamble, a start-of-frame (ST), an operation (OP) code, a port address, a device address, and a turnaround code.

14. .A method of data management, comprising:
  monitoring a bus of a management data system to detect a presence of a next-data code on the bus;
  discarding the next-data code following detection of the next-data code on the bus;
  incrementing a previously latched register address in response to the detection of the next-data code; and
  storing, at the incremented register address, a predetermined number of bits following the next-data code.

15. The method according to claim 14, wherein the next-data code immediately precedes the predetermined number of bits.

16. The method according to claim 15, wherein the incremented latched register address and the previously latched register address have consecutive register addresses.

17. The method according to claim 14, wherein the previously latched register address is associated with a preceding management data input/output (MDIO) address transaction.

18. The method according to claim 14, wherein the previously latched register address is incremented by a predetermined increment step value.

19. The method according to claim 14, wherein next-data code is indicative of a page-write transaction.

20. A method of data management utilizing a management data input/output (MDIO) protocol, the method comprising:
  transmitting a first communication frame including an address block, the address block identifying a first address associated with a register of a MDIO manageable device;
  transmitting a second communication frame including a data block, the data block including first data for storage in the register at the first address; and
  transmitting a third communication frame including a next-data code and a second data block, wherein the next-data code is indicative of a second address of the register that is a predetermined increment of the first address, and wherein the second data block includes second data for storage in the register at the second address.

21. The method of claim 20, wherein the third communication frame is transmitted consecutively after the second communication frame, without an intervening frame being transmitted between the second and the third communication frames.

* * * * *

UNITED STATES PATENT AND TRADEMARK OFFICE
CERTIFICATE OF CORRECTION

PATENT NO. : 8,812,741 B2  
APPLICATION NO. : 13/628640  
DATED : August 19, 2014  
INVENTOR(S) : Whay Sing Lee Page 1 of 1

It is certified that error appears in the above-identified patent and that said Letters Patent is hereby corrected as shown below:

In the Claims

Column 12, line 21, please replace "page write" with --page-write--.

Column 12, line 63, please replace "page write" with --page-write--.

Column 13, line 16, please replace ".A method" with --A method--.

Signed and Sealed this  
Eleventh Day of November, 2014

Michelle K. Lee  
*Deputy Director of the United States Patent and Trademark Office*